United States Patent
Chikaraishi et al.

(10) Patent No.: US 6,464,254 B2
(45) Date of Patent: Oct. 15, 2002

(54) AIRBAG INFLATOR AND METHOD OF MANUFACTURING THE SAME

(75) Inventors: Tsuneo Chikaraishi, Tokyo (JP); Makoto Doi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/892,462

(22) Filed: Jun. 28, 2001

(65) Prior Publication Data

US 2002/0000716 A1 Jan. 3, 2002

(30) Foreign Application Priority Data

Jun. 29, 2000 (JP) ........ 2000-195893

(51) Int. Cl.[7] .............................. B60R 21/26
(52) U.S. Cl. ............... 280/741; 29/516; 29/522.1
(58) Field of Search ............... 280/741, 736; 102/530, 531; 29/516, 522.1

(56) References Cited

U.S. PATENT DOCUMENTS 5,450,667 A * 9/1995 Gire ................. 29/522.1
5,970,880 A * 10/1999 Perotto ............. 280/741

FOREIGN PATENT DOCUMENTS

| JP | 10-329638 | 12/1998 |
|----|-----------|---------|
| JP | 11-263185 | 9/1999 |
| JP | 2000-233705 | 8/2000 |
| WO | 00/50274 | * 8/2000 |

* cited by examiner

Primary Examiner—Peter C. English
(74) Attorney, Agent, or Firm—Kanesaka & Takeuchi (57) ABSTRACT

An airbag inflator for generating gas for deploying an airbag includes a cylindrical body, at least one partition disposed in the cylindrical body to divide the cylindrical body into a plurality of combustion chambers, a crimping portion formed at the cylindrical body near an outer periphery of the partition for holding the same, and a coining portion formed in at least one of side surfaces of the partition near the outer periphery thereof. The diameter of the partition is enlarged by the coining portion, so that the outer periphery of the partition securely contacts an inside of the cylindrical body to seal therebetween.

9 Claims, 7 Drawing Sheets

AIRBAG INFLATOR AND METHOD OF MANUFACTURING THE SAME

BACKGROUND OF THE INVENTION AND RELATED ART STATEMENT

The present invention relates to an inflator for generating gas for inflating and deploying an airbag and a method of manufacturing the same. More particularly, the present invention relates to an airbag inflator and a method of manufacturing the same having advantages such as reduced manufacturing cost.

Airbag inflators are gas generators for deployment of airbags. Some inflators have a plurality of gas combustion chambers. By adjusting the ignition selectively or ignition timing of the gas generants in the combustion chambers, the gas generation for deploying an airbag can be adapted to the severity of accident and the situation of an occupant, thereby achieving a preferable airbag deployment.

For instance, an inflator of this kind is disclosed in Japanese Patent Publication (KOKAI) H10-329638.

Figure 5:
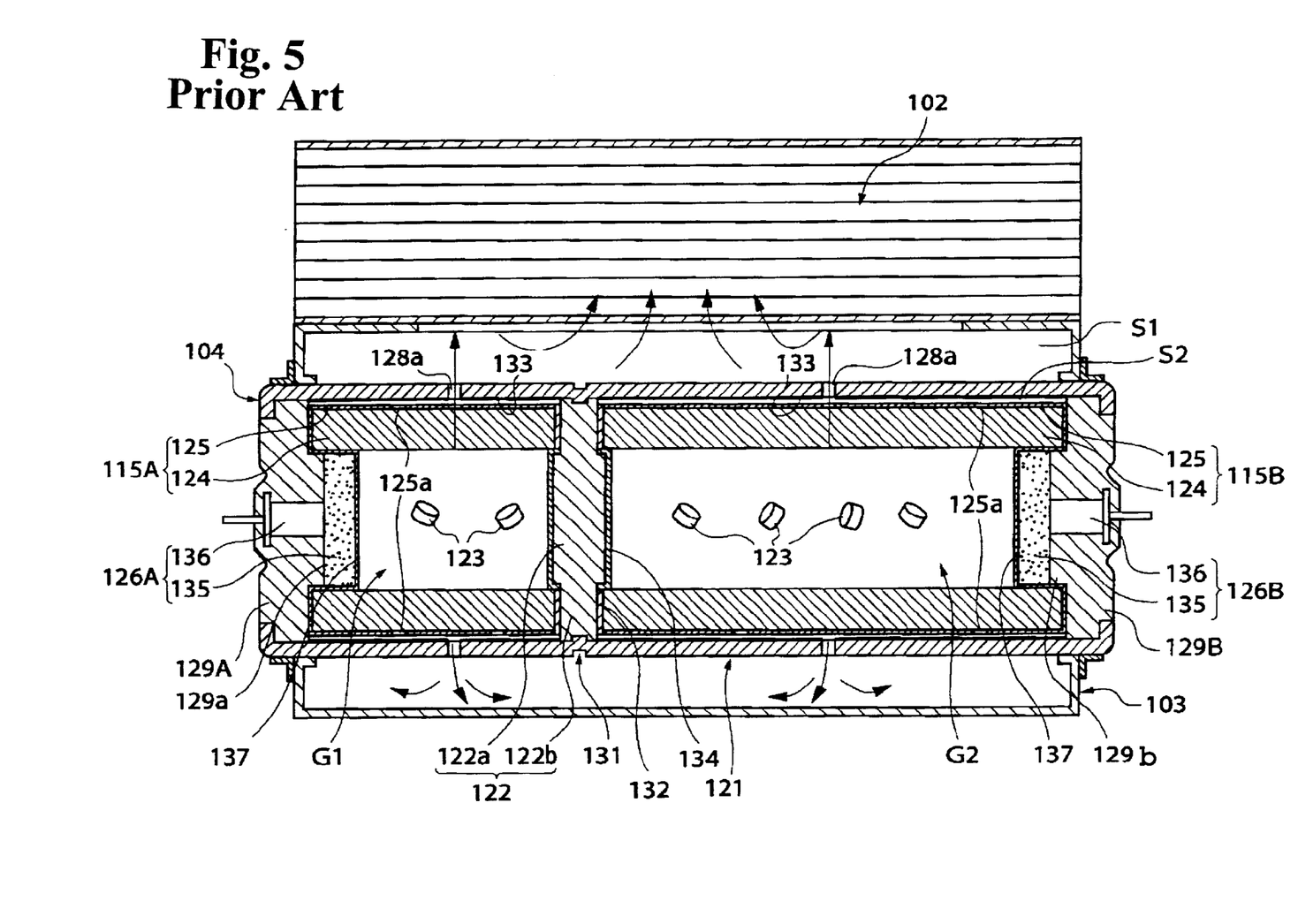
FIG. 5 is a sectional view showing the internal structure of a convention airbag module.

FIG. 5 is a sectional view showing the internal constitution of an airbag module. The airbag module shown in FIG. 5 comprises a gas generator (inflator) 104, and an airbag 102 which is deployed with a gas discharged from the gas generator 104. The inflator 104 is accommodated in a module casing 103. In FIG. 5, the airbag 102 is in a folded state. Defined between the inner surface of the module casing 103 and the outer surface of the gas generator 104 is a space S1 as a gas passage for airbag deployment.

The gas generator 104 comprises a cylindrical outer shell 121. Both ends of the outer shell 121 are closed by lid members 129A (left side) and 129B (right side). A disc-like partition 122 is fixed to a middle portion of the outer shell 121. The partition 122 comprises a central disc portion 122a and a flange 122b radially extending from the central disc portion 122a. The partition 122 is crimped at a drawn portion (crimped portion) 131 of the outer shell 121. The inside of the outer shell 121 is divided into a first combustion chamber GI with a small capacity and a second combustion chamber G2 with a large capacity. The id outer shell 121 is provided with a plurality of gas outlets 128a corresponding to the combustion chambers G1, G2. The gas outlets 128a are normally closed by burst plates 133.

Arranged in the combustion chambers G1, G2 of the outer shell 121 are filter cylinders 115A, 115B, respectively. Each filter cylinder 115A, 115B is composed of an inner shell 125 and a filter 124 attached to the inner surface of the inner shell 125. There is a space S2 as a gas passage defined between the inner surface of the outer shell 121 and the outer surface of the filter cylinder 115A or 115B. The inner spaces of the filter cylinders 115A, 115B are filled with gas generants 123. The inner shell 125 is provided with a plurality of gas holes 125a for allowing the communication between the filter 124 and the space S2. The left end of the filter cylinder 115A in FIG. 5 is fitted to a convexity 129a formed on the inner face of the lid member 129A. On the other hand, the right end of the filter cylinder 115B in FIG. 5 is fitted to a convexity 129b formed on the inner face of the lid member 129B. The flange 122b of the partition 122 is sandwiched between the filter cylinders 115A and 115B.

Annular seals 132 are interposed between the filter cylinders 115A, 115B and the flange 122b of the partition 122, respectively. The annular seals 132 isolate the gas flow and heat transfer between the filter cylinders 115A and 115B.

Cushion members 134 are attached to both surfaces of the central disc portion 122a, respectively. The cushion members 134 prevent the gas generants 123 to become powder and also isolate the heat transfer between the combustion chambers G1 and G2. The annular seals 132 and the cushion members 134 are made of a material having heat insulation property.

The lid members 129A, 129B at both sides of the outer shell 121 include initiators 126A, 126B. Each initiator 126A or 126B includes a booster propellant 135 and an igniter 136. The booster propellant 135 is accommodated in a cap 137 fitted to the convexity 129a (129b) of the lid member 129A (129B). As the igniter 136 is triggered, the booster propellant 135 is fired so that fire spouts out into the combustion chamber through holes (not shown) of the cap 137. The fire spreads to ignite the gas generant 123 so that the gas generant 123 burns to generate gas with high temperature and high pressure. The gas flows into the filter 124 where the slag contained in the gas is removed and the gas is cooled. Then, the gas flows into the space S2 through the gas holes 125a of the inner shell 125. As the inner pressure of the combustion chamber reaches a predetermined value, the burst plates 133 are torn, so that the gas spouts out into the space S1 through the gas outlets 128a. Then, the gas flows into the airbag 102, thereby inflating and developing the airbag.

Because of the two chambers G1, G2 of the gas generator 104, the deployment of the airbag 102 can be controlled as explained below.

In the highly severe collision, both initiators 126A and 126B are triggered simultaneously. Therefore, the gas generants 123 in the first and second combustion chambers G1 and G2 are fired simultaneously to discharge a large amount of gas, thereby inflating and deploying the airbag 102 immediately.

In the medium collision, the initiator 126B for the second combustion chamber G2 having a larger capacity for generating a larger amount of gas is triggered first. After a very short time, the initiator 126A for the first combustion chamber G1 having a smaller capacity for generating a smaller amount of gas is In triggered. Therefore, the airbag 102 is inflated and developed slowly by the gas generated in the second combustion chamber G2 in the initial stage. From the middle stage, the airbag 102 is developed rapidly by the total of the gases generated in both combustion chambers G1 and G2, respectively.

In the relatively light collision, only the initiator 126B for the second combustion chamber G2 is triggered. Alternatively, the initiator 126A of the first combustion chamber G1 is also triggered after a large time delay following the beginning of the initiator 126B. In this case, the airbag 102 is slowly inflated and developed for a relatively long period of time.

By the way, the conventional gas generator 104 mentioned above has the following drawbacks. When the gas generant 123 in one of the combustion chambers G1, G2 is fired, a large pressure difference is applied to the partition 122. Since the partition 122 is just crimped at the crimp portion of the outer shell 121, the sealing property between the chambers G1 and G2 is poor, though the thickness of the partition 122 is large.

Figure 6A:
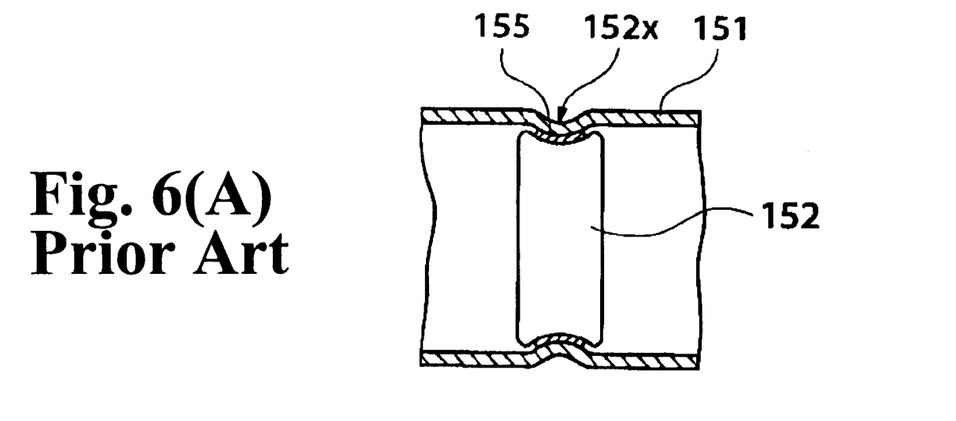
FIGS. 6(A)–6(C) are sectional views for explaining examples of fixing and sealing structures between the partition and the outer shell in conventional gas generators.
Figure 6B:
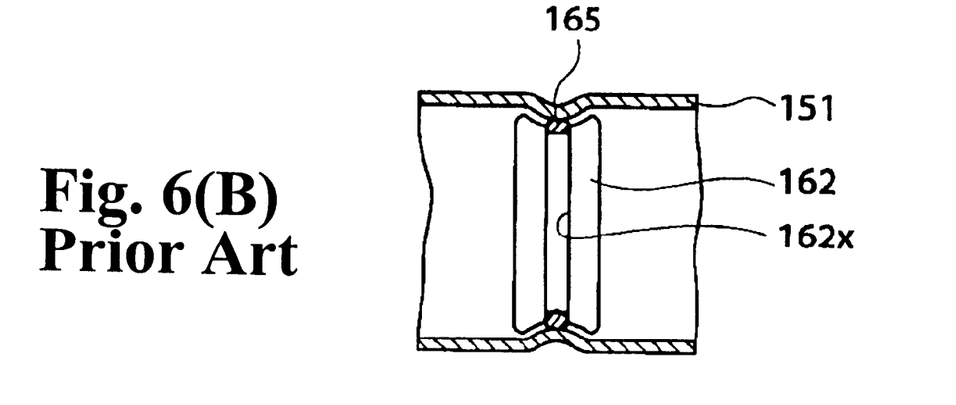
Figure 6C:
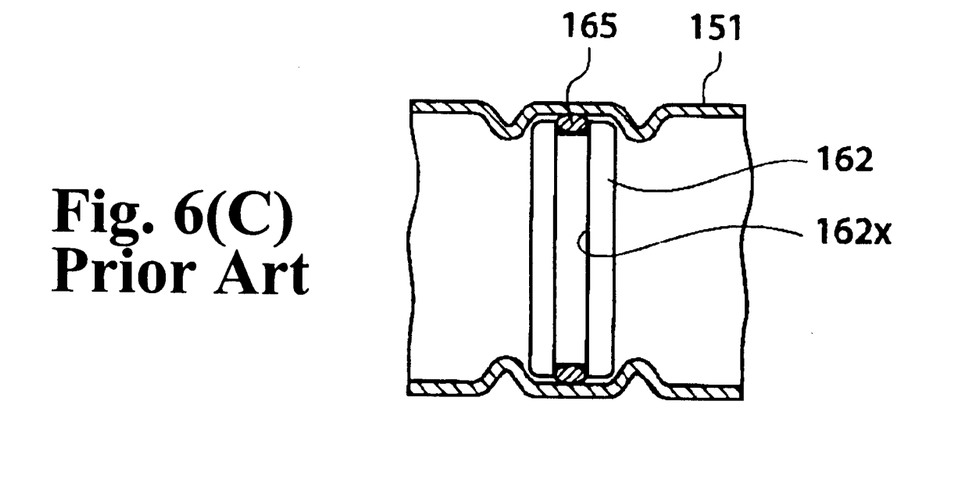

To improve the sealing property between the chambers, as shown in FIGS. 6(A)–6(C), other crimping methods are also known in which sealing members, such as O rings and gaskets, are interposed between the outer periphery of the partition and the inner surface of the outer shell.

FIGS. 6(A)–6(C) are sectional views for explaining the examples of the fixing and sealing structure between the partition and the outer shell in the conventional gas generator.

Referring to FIG. 6(A), a gasket 155 is interposed between the outer periphery of the partition 152 and the inner surface of the outer shell 151, so that the partition 152 is crimped at a middle portion 152x in the thick direction of the partition.

Referring to FIG. 6(B), the partition 162 is provided with an O-ring groove 162x formed in a middle portion in the thick direction of the partition 162. An O-ring 165 is fitted in the O-ring groove 162x. The partition 162 is crimped at the portion where the O-ring 165 is fitted.

Referring to FIG. 6(C), this example is similar to the example shown in FIG. 6(B) using an O-ring 165 for sealing the partition 162. In this case, the partition 162 is crimped at two locations i.e. both sides.

Since the above examples shown in FIGS. 6(A)–6(C) use sealing members, such as the gasket 155 and the O-ring 165, however, the sealing member may be decomposed due to heat of combustion of the propellants in the gas generator, and mixed into the gas for deploying the bag. There is also a possibility of leakage at the sealing member due to hot blast produced when the propellants are burned. In case that the partition is formed with the O-ring groove 162x as shown in FIGS. 6(B) and 6(C), the thickness of the partition should be increased for ensuring the groove width. This increases the working cost and thus the manufacturing cost, and prevents the miniaturization of the gas generator.

Further, as another example, a gas generator is disclosed in Japanese Patent Publication (KOKAI) No. 2000-233705 published on Aug. 29, 2000, which was filed by the assignee of the present invention.

Figure 7:
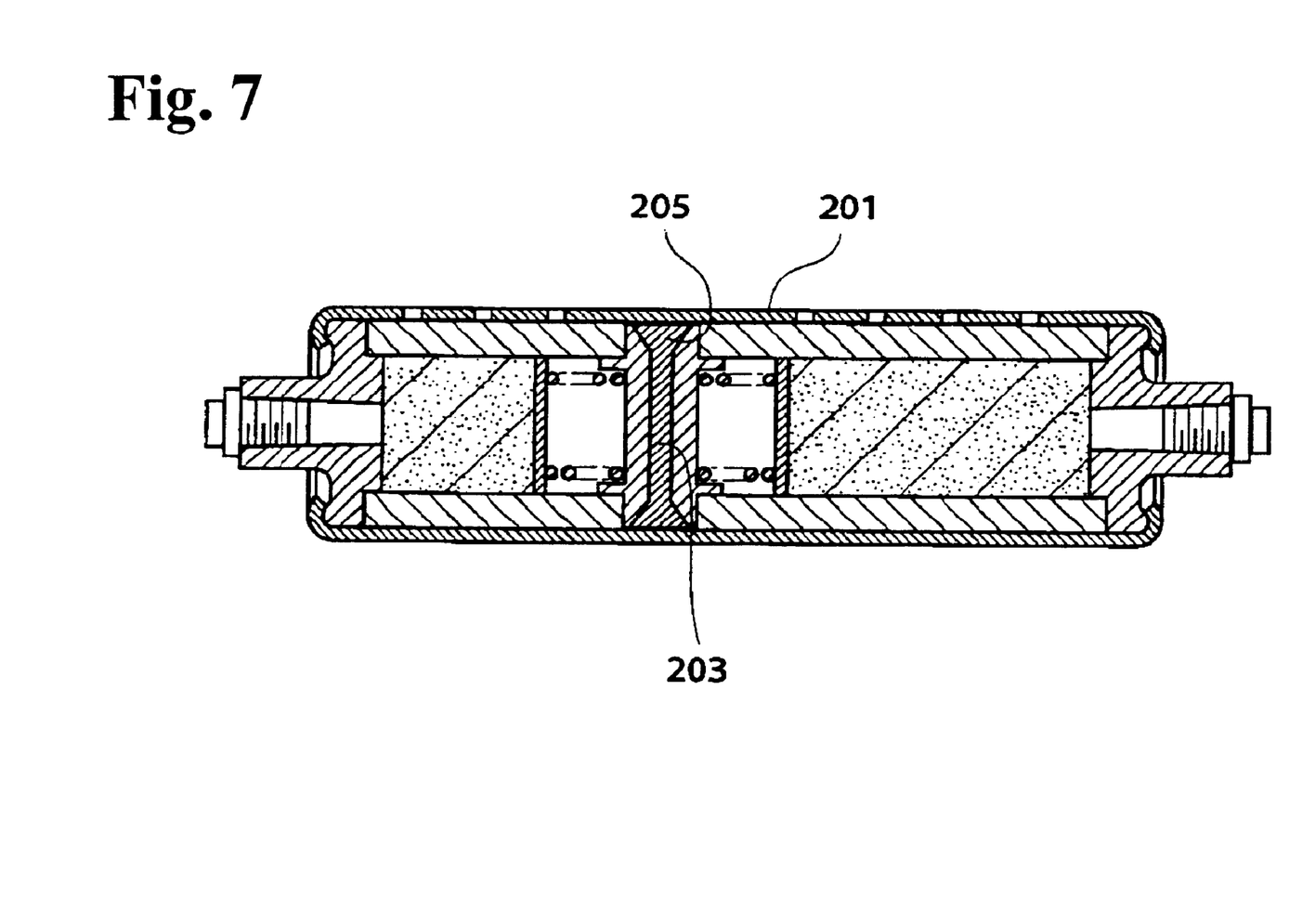
FIG. 7 is a sectional view showing the gas generator disclosed in a related application.

FIG. 7 is a sectional view showing the gas generator disclosed in the above application. As for the gas generator, description will be made as regard to only a partition (bulkhead) and an outer shell (housing). Description of the rest of the parts, i.e. initiator, gas generant, filter, will be omitted.

The outer shell or housing 201 of the gas generator is a cylindrical member. Disposed inside the housing 201 is a partition 203 having a substantially disc-like configuration. The partition 203 has enlarged edge portion 205 along the outer periphery thereof. The enlarged edge portion 205 has a width gradually increased toward the outer periphery so that its section is triangle.

The partition 203 is fixed to the housing 201 in the following method. Namely, the partition 203 is brought to a predetermined position in the housing 201, and tools, such as punches, (not shown) are inserted from the both sides of the housing 201. The tools are tapered toward the ends. The both surfaces of the partition 203 are pressed by the ends of the tools so as to plastically deform the outer peripheral portion of the partition 203 in such a manner as to bring the outer periphery of the partition 203 in close contact with the inner surface of the housing 201. This method for fixing the partition of the gas generator shown in FIG. 7 is advantageous. However, the thickness of the partition should be increased to withstand high inner pressure. The increased thickness makes the workability for fixing the partition 203 poor. Since the thickness of the enlarged edge portion 205 around the outer periphery of the partition should be correspondingly increased, it is difficult to employ the crimping of the outer shell 201 together.

There is another method disclosed in Japanese Patent Publication (KOKAI) No. H11-263185, which comprises preparing two pressure canisters and integrating the pressure canisters together by welding. However, this method requires high accuracy of welding, thus increasing the cost.

The present invention has been made to solve the aforementioned problems and an object of the present invention is to provide an airbag inflator which is suitable for reducing the manufacturing cost and the weight.

It is also an object of the present invention to provide a method of manufacturing such inflator.

Further objects and advantages of the invention will be apparent from the following description of the invention.

SUMMARY OF THE INVENTION

To solve the aforementioned problems, the present invention provides an airbag inflator for generating gas for deploying an airbag comprising a cylindrical body which is divided into a plurality of combustion chambers by at least one inner partition. The portions of the cylindrical body corresponding to the outer peripheral edges of the partition are processed by crimping, and the seal between the outer periphery of the partition and the inside of the cylindrical body is ensured by enlarging the diameter of the partition. The enlargement of the diameter of the partition is achieved by coining for forming a groove in at least one of side surfaces of the partition near the outer periphery thereof.

While such an inflator can be manufactured by relatively easy processing, the seal at the partition can be ensured and the fixing strength between the partition and the body can be further improved. The groove formed by the coining may have a ring shape, a cross shape, or a radial shape.

In a method of manufacturing an airbag inflator of the present invention, an inflator for generating gas for deploying an airbag is manufactured. The method comprises dividing the inside of a cylindrical body into a plurality of combustion chambers by a partition, crimping portions of the cylindrical body corresponding to the outer peripheral edges of the partition, and ensuring the seal between the outer periphery of the partition and the inside of the cylindrical body by enlarging the diameter of the partition. The enlargement of the diameter of the partition is achieved by coining for forming a groove in at least in one of side surfaces of the partition near the outer periphery thereof. In the method of manufacturing the airbag inflator of the present invention, it is preferable that the coining is conducted after the crimping.

DETAILED DESCRIPTION OF PREFERRED EMBODIMENTS

Hereinafter, the description will be made with reference to the attached drawings.

Figure 1:
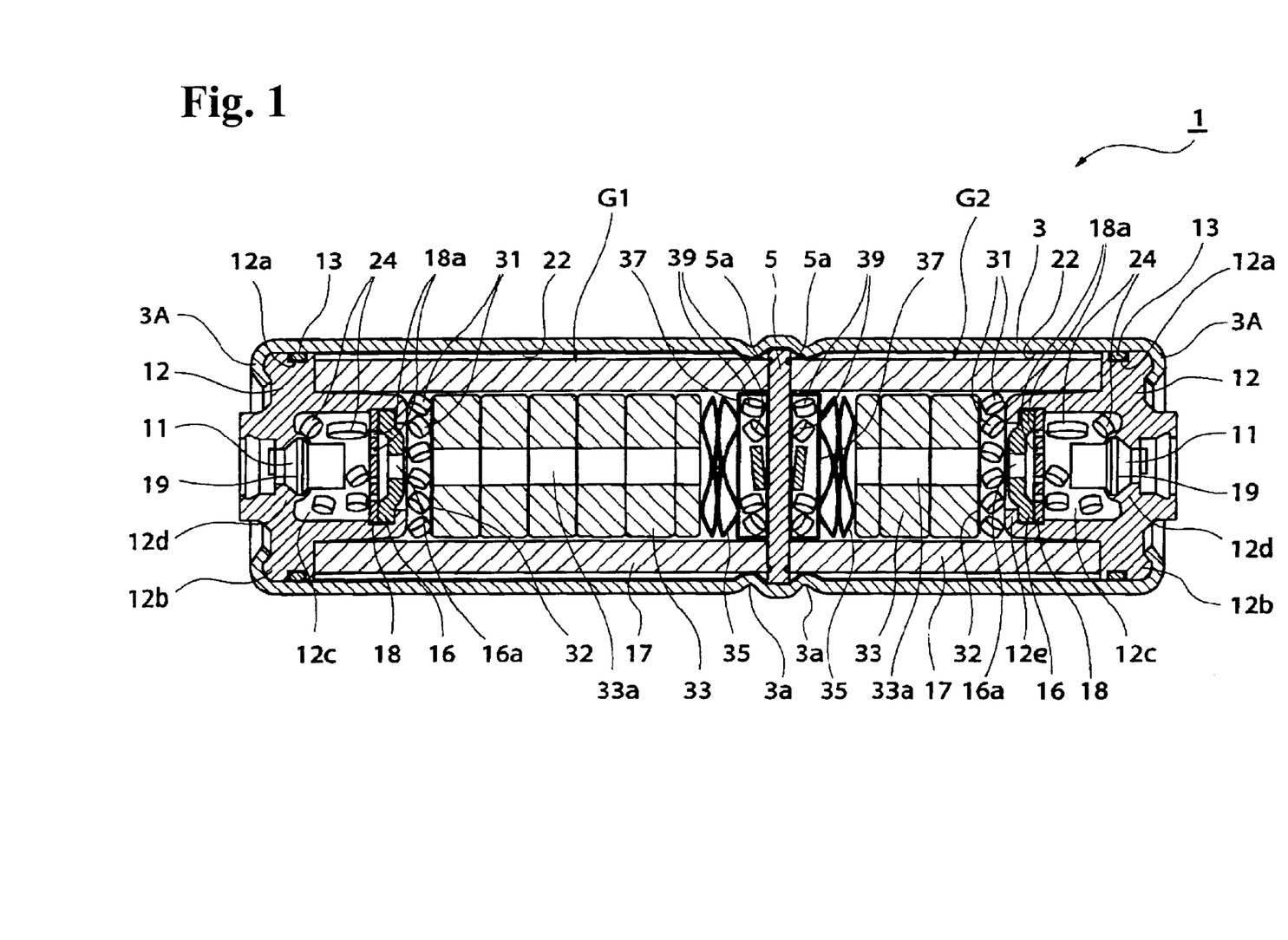
FIG. 1 is a sectional view showing an internal structure of an airbag inflator according to an embodiment of the present invention.
Figure 2:
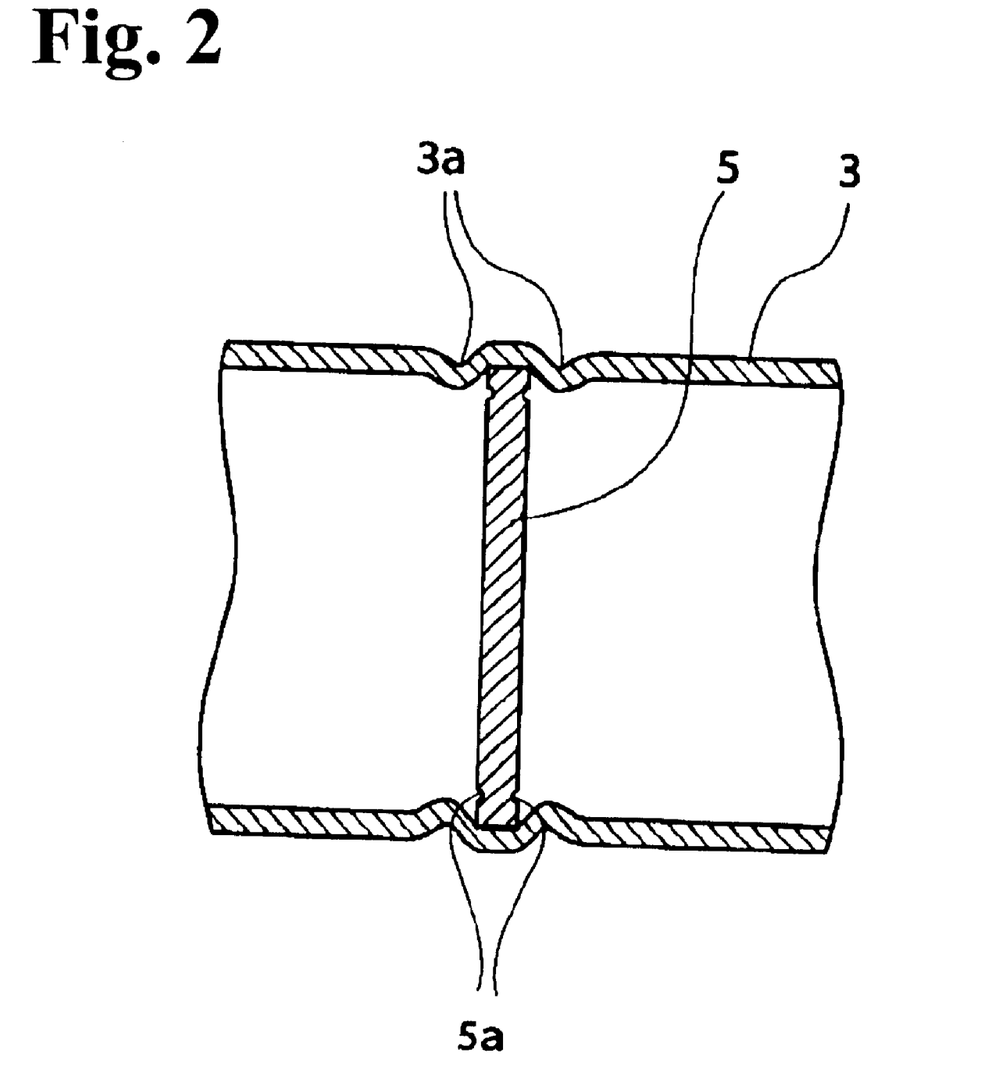
FIG. 2 is an enlarged sectional view showing a partition and a body of the inflator shown in FIG. 1.
Figure 3A:
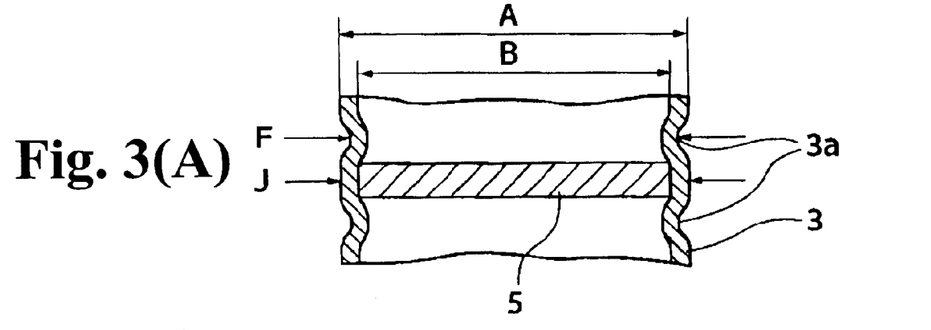
FIGS. 3(A)–3(C) are explanatory sectional views for explaining the process for fixing the partition to the body of the inflator according to the present invention.
Figure 3B:
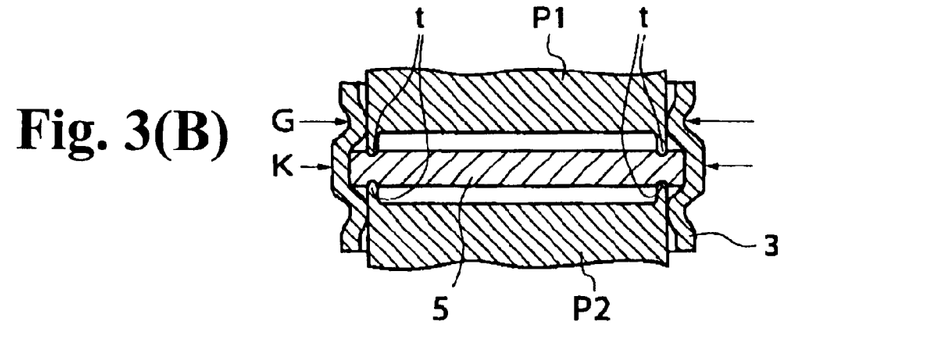
Figure 3C:
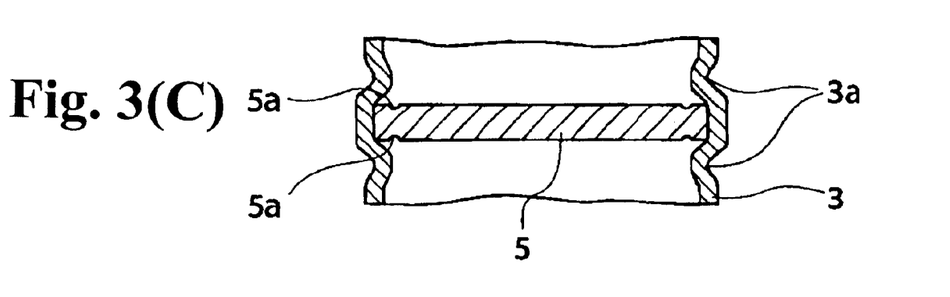

FIG. 1 is a sectional view showing the internal structure of an airbag inflator according to an embodiment of the present invention. FIG. 2 is an enlarged sectional view showing a partition and a body of the inflator shown in FIG. 1. FIGS. 3(A)–3(C) are sectional views for explaining the process for fixing the partition to the body of the inflator according to the present invention. In the following description, the terms, such as "up", "down", "right", and "left", refer to the directions in FIG. 1.

Shown in FIG. 1 is a passenger dual inflator having two combustion chambers. The inflator 1 of this embodiment comprises an elongated cylindrical body 3. Disposed inside the body 3 is a partition 5 having a disc-like configuration. The inside of the body 3 is divided into a left combustion chamber G1 with a large capacity and a right combustion chamber G2 with a small capacity. The left and right combustion chambers G1, G2 have basically the same constitution except different lengths in the longitudinal direction. The body 3 may be a deep drawing shell or a seam welded pipe which are made of steel. The body 3 has gas outlets (not shown) formed in a peripheral wall thereof.

As best shown in FIG. 2, sandwiching portions of the body 3 corresponding to the outer peripheral edges of the partition 5 are processed by crimping so as to form valleys 3a at two locations sandwiching the partition 5, so that the body 3 has a reduced diameter at the locations. The partition 5 has ring-like grooves 5a formed in both side surfaces near the outer periphery by coining. As a result, the diameter at the outer peripheral portion of the partition 5 is increased, and the outer peripheral portion closely contacts the inner surface of the body 3. By the crimping to reduce the diameter of the body 3 and the coining to increase the diameter of the partition 5, the partition 5 can be strongly fixed to the body 3 and the sealing between the outer periphery of the partition 5 and the inside of the body 3 can be achieved.

Referring to FIGS. 3(A)–3(C), the working process for the body 3 and the partition 5 will be described hereinafter. In the first step, as shown in FIG. 3(A), the partition 5 before coining is inserted through an opening of the body 3 to a predetermined position. After that, the body 3 is processed by crimping at two locations to sandwich the partition 5. By this crimping, the body 3 is formed to have two valleys 3a. The partition 5 is sandwiched and held between the two valleys 3a, whereby the partition 5 is fixed to the body 3.

In the second step, as shown in FIG. 3(B), punches P1, P2 are inserted through the openings at the both sides of the body 3. The punches P1, P2 are each provided with an annular projection t around the outer periphery of the end face thereof. By pressing the punches P1, P2 against the partition 5, the annular projections t of the punches P1, P2 sink or enter into portions of the side surfaces of the partition 5 near the outer periphery thereof. In this manner, the coining is achieved, so that the outer diameter of the partition 5 is increased, and the outer periphery of the partition 5 is pressed against the inner surface of the body 3.

In third step, as shown in FIG. 3(C), the punches P1, P2 are pulled out from the inside of the body 3. In this way, the fixation of the partition 5 to the body 3 is achieved.

With regard to the coining of the partition 5 and the crimping of the body 3, concrete numeric examples will be shown below. In the following description, letters A, B, F, G, J and K correspond to the dimensions of the parts marked by the same letters in FIGS. 3(A) and 3(B).

The dimensions about the body 3 and the partition 5 used in this embodiment are as follows:

Outer Diameter A of the body 3=51.8 mm
Inner Diameter B of the body 3=46.86 mm
Outer Diameter of the partition 5 before coining=46.65 mm
Wall thickness of the partition 5=5.15 mm
Chamfer Radius of the outer edge of the partition 5=0.3 mm As the body 3 and the partition 5 are processed by the method of the present invention, the following results are obtained.

After the body 3 is processed by crimping to form the valleys 3a in the first step (see FIG. 3(A)), the diameter F of the body 3 at the valley is 48.53 mm (F=48.53 mm), and the outer diameter J of the body 3 at the location where the partition 5 is positioned is 51.51 mm (J=51.51 mm).

After the partition 5 is processed by coining while using the punches P1, P2 in the second step (see FIG. 3(B)), the outer diameter of the partition 5 is increased by an amount about 0.5 mm. After the coining, the diameter C of the body 3 at the valley is 49.02 mm (G=49.02 mm) and the outer diameter K of the body 3 at the location where the partition 5 is positioned is 51.85 mm (K=51.85 mm)

Such coining process can slightly increase the diameter of the partition only with a relatively low force for pressing the punches, so that it can be said that the workability is good. The crimping to the body 3 can further ensure the fixing strength between the partition 5 and the body 3.

Though the partition 5 is arranged along the radial direction of the body 3 in the above embodiment, the partition 5 may be fixed to the body 3 in a state inclined relative to the radial direction of the body 3.

Returning to FIG. 1, description will now be made as regard to the structures of the rest of the parts of the inflator 1.

Open ends 3A of the body 3 are processed to be folded inwardly toward the middle of the body 3. The peripheral surfaces of closures or lids 12 contact the inner surfaces of the ends 3A, respectively. The closures 12 are lids for closing the open ends of the combustion chambers G1, G2. Each closure 12 is provided with an annular groove 12a, formed in the peripheral surface thereof, into which a gasket 13 is fitted. Each closure 12 has a ridge 12b formed in a ring-like shape on an outside portion of the peripheral surface thereof. The ridge 12b contacts the inner surface of the end 3A of the body 3.

Each closure 12 is provided with an initiator receiving portion 12d at the inner center thereof. An initiator 11 is fixed to the initiator receiving portion 12d through a gasket 19. Corresponding to an electrical ignition signal, the initiator 11 emits ignition flame into the body 3 toward the middle of the body 3. The closure 12 has a cylindrical portion 12c with a bottom, which has a space therein formed at a location nearer to the middle of the body than the initiator receiving portion 12d. Accommodated in the space of the cylindrical portion 12c are granulated booster propellants or initiating agent 24. The booster propellants are fired by the ignition flame from the initiator 11.

Fitted in an open end 12e of the closure 12 at the rear side thereof is a lid-like plate 16. The plate 16 has a hole 16a formed at the center thereof. Attached to the inside of the plate 16 is a standoff or plate 18. The standoff 18 has a plurality of holes 18a therein. As the booster propellants 24 are fired, the inner pressure of the space 12c of the closure 12 is increased, so that the combustion flame produced by combustion of the booster propellants 24 spouts out through the holes 18a of the standoff 18 and the hole 16a of the plate 16 into the combustion chamber G1 or G2.

Inside the combustion chambers G1, G2, cylindrical cleaning filters 17 are arranged, respectively. The cleaning filter 17 is made of steel wool or the like, and functions to remove solid materials from the combustion gas and also to reduce the temperature of the combustion gas. Inside each cleaning filter 17, tablet-like booster propellants 31 are filled behind the closure 12. Further behind the booster propellants 31, cylindrical wafer propellants 33 are filled via a retainer 32. Each wafer propellant 33 has a combustion gas passage 33a along the axis thereof.

Arranged behind the wafer propellants 33 is a spring 35. The spring 35 functions for buffering the movement of the wafer propellants 33 and the booster propellants 31. Further arranged between the spring 35 and the partition 5 is an ignition cup 37. Accommodated in the ignition cup 37 are tablet-like booster propellants 39. The ignition cup 37 is a container for the booster propellants 39. The wafer propellants 33 can be burned from both sides thereof by the booster propellants 39 and 31.

Attached to the inner surface of the body 3 are seals 22 made of an aluminum foil or the like. The seals 22 function to lightly close the gas outlets (not shown) of the body 3. The seals 22 prevent outside air from entering the inside of the body 3, thereby preventing the propellants from being moistened and thus preventing the performance of the propellants from degrading. As the inner pressure is increased as a result of combustion of the propellants inside the left and right combustion chambers G1, G2, the seals 22 are broken after reaching the initial inner pressure, so that the gas spouts out into the airbag (not shown) through the gas outlets (not shown).

Hereinafter, the action of the airbag inflator 1 having the aforementioned constitution will be described.

As an electric ignition signal is outputted from a controller (not shown) in the event of vehicle collision, the initiators 11 are triggered corresponding to the ignition signal. Then, the booster propellants 24 in the cylindrical portions 12c of a the closures 12 are fired at the same time to generate gas. The gas spouts out into the combustion chambers through the holes 18a of the standoffs 18 and the holes 16a of the plates 16. The gas fires the booster propellants 31 and also fires the wafer propellants 33. Further, the gas fires the booster propellants 39 after passing through the combustion gas passages 33a of the wafer propellants 33. The booster propellants 31 and 39 at the both sides of the wafer propellants 33 are fired and burned, whereby the wafer propellants 33 are burned from the both sides.

Solid materials in the combustion gas are removed by the cleaning filters 17 and the temperature of the combustion gas is reduced by the cleaning filters 17. Then, the gas is supplied into the airbag through the gas outlets (not shown) of the body 3, thereby inflating and deploying the airbag.

It should be noted that the pressures in the combustion chambers G1, G2 during combustion are in a range from 40 to 60 MPa and that the temperature of the propellants when burned is two thousand and several hundred degrees centigrade.

In the airbag inflator 1 of this embodiment, the deployment of the airbag can be controlled according to the severity of vehicle accident and the situation of an occupant, as follows:

In the event of highly severe collision, the left and right initiators 11 are triggered simultaneously.

In the event of medium collision, the initiator 11 for the left combustion chamber G1 having a larger capacity for generating a larger amount of gas is triggered first. After about 40 ms, the initiator 11 for the right combustion chamber G2 having a smaller capacity for generating a smaller amount of gas is triggered. Therefore, the airbag is inflated and developed slowly in the initial stage. From the middle stage, the airbag is developed rapidly.

In the event of light collision, only the initiator 11 for the left combustion chamber G1 is triggered. Alternatively, the initiator 11 at the right combustion chamber G2 may be also triggered after a time delay about 120 ms following the initial operation of the initiator 11. In this case, the airbag is slowly inflated and developed for a relatively long period of time.

Figure 4:
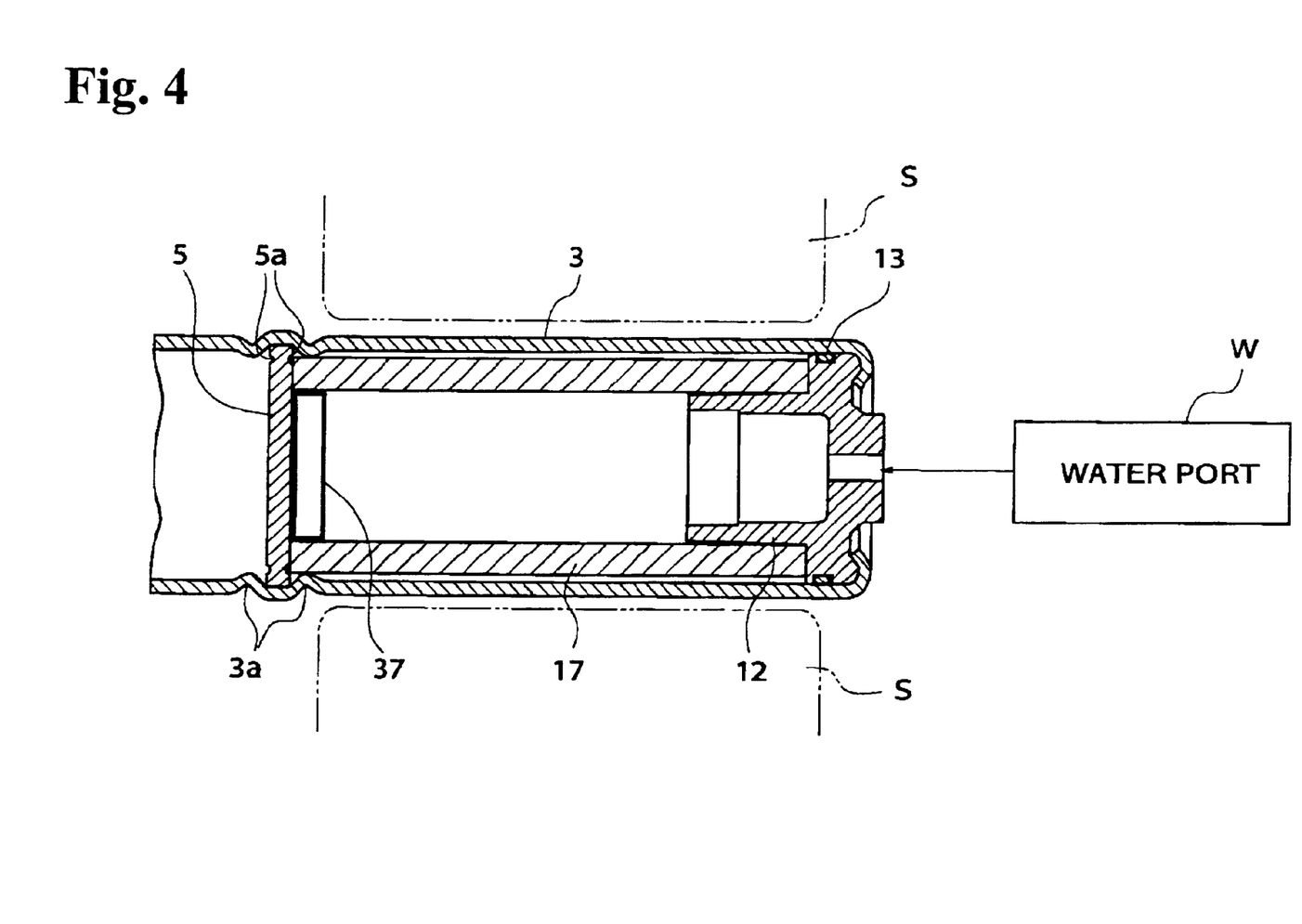
FIG. 4 shows a method of conducting a pressure test for the partition in the body in the inflator of this embodiment.

FIG. 4 shows a method of conducting a pressure test for the partition 5 in the body 3 in the inflator 1 of this embodiment. The pressure test is a hydraulic pressure test. Shown in FIG. 4 are the body 3 and the partition 5 which are prepared as mentioned above and shown in FIGS. 3(A)–3(C), and in which the closure 12, the cleaning filter 17 and the ignition cup 37 are arranged. The body 3 is secured from the vertical directions by a support S. In this state, water is injected from a water port W to the partition 5 through the opening of the closure 12.

Such hydraulic tests were conducted three times for each of two samples with the partitions 5. Concrete numerical dimensions of the respective samples are as follows:

Sample A: outer diameter=46.65 mm, wall thickness= 5.15 mm, chamfer radius of outer edge=0.3 mm Sample B: outer diameter=46.3 mm, wall thickness=4.85 mm, chamfer radius of outer edge=0.7 mm By using the above-mentioned samples A and B, water was injected from the water port W as shown in FIG. 4. Water pressure was measured when water starts to leak into the other chamber, i.e. the chamber on the left side of the partition in the drawing.

Results of the tests are as follows.

As for the sample A, the pressures at the start point of water leakage were, the first time: 93 MPa, the second time: 88.1 MPa, and the third time: 95.5 MPa.

As for the sample B, the pressures at the start point of water leakage were, the first time: 81 MPa, the second time: 83.6 MPa, and the third time: 83.8 MPa.

As mentioned above, it is found that both samples A and B can withstand pressure at least about 80 MPa.

As apparent from the above description, the present invention can provide an airbag inflator which is suitable for reducing the manufacturing cost and the weight.

While the invention has been explained with reference to the specific embodiments of the invention, the explanation is illustrative, and the invention is limited only by the appended claims.

What is claimed is:

1. An airbag inflator for generating gas for deploying an airbag, comprising:

an elongated cylindrical body, at least one partition disposed in the cylindrical body to divide the cylindrical body into a plurality of combustion chambers, a crimping portion formed at the cylindrical body near an outer periphery of the at least one partition for holding the at least one partition, and a coining portion formed in at least one of side surfaces of the at least one partition near the outer periphery thereof, a diameter of the at least one partition being enlarged by the coining portion so that the outer periphery of the partition securely contacts an inside of the cylindrical body to seal therebetween.

2. An airbag inflator according to claim 1, wherein said coining portion is a groove formed in the at least one of the side surfaces of the partition.

3. An airbag inflator according to claim 2, wherein two crimping portions are formed at the cylindrical body to sandwich the at least one partition therebetween.

4. An airbag inflator according to claim 3, wherein one partition is situated in the cylindrical body, and two coining portions are formed symmetrically on two side surfaces of the partition to thereby form two chambers.

5. An airbag inflator according to claim 4, further comprising booster propellants disposed in the two chambers near the partition, lids with initiators fixed to two ends of the cylindrical body away from the partition, and wafer propellants disposed in the two chambers between the booster propellant and the lid, respectively.

6. A method of manufacturing an airbag inflator for generating gas for deploying an airbag, comprising:

disposing a partition inside a cylindrical body to divide the cylindrical body into a plurality of combustion chambers, crimping the cylindrical body at a portion near an outer peripheral edge of the partition, and forming a groove in at least one of side surfaces of the partition near the outer periphery thereof to enlarge the partition outwardly to thereby seal between the outer periphery of the partition and an inside of the cylindrical body.

7. A method of manufacturing an airbag inflator according to claim 6, wherein the groove is formed by coining process to enlarge the diameter of the partition.

8. A method of manufacturing an airbag inflator according to claim 7, wherein the cylindrical body is crimped at two portions thereof to sandwich the outer peripheral edge of the partition therebetween.

9. A method of manufacturing an airbag inflator according to claim 8, wherein two grooves are formed symmetrically on two side surfaces of the partition by coining process.

* * * * *